Jan. 1, 1924. 1,479,474
G. R. MEYERCORD
BOOTH OR COMPARTMENT
Filed Feb. 16, 1922    3 Sheets-Sheet 2
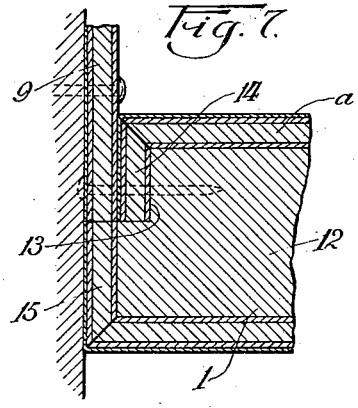
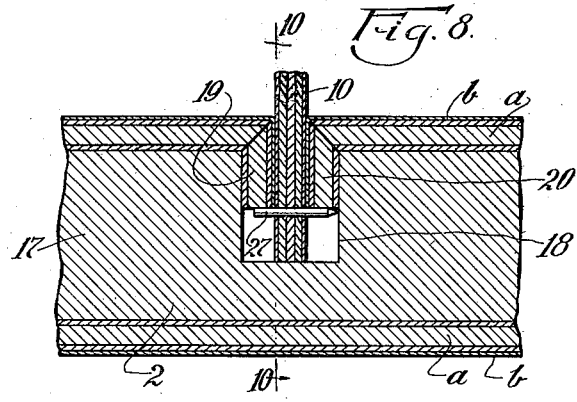
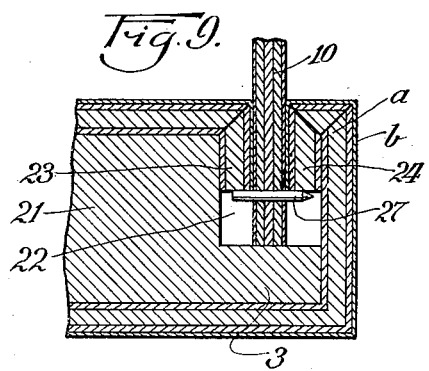
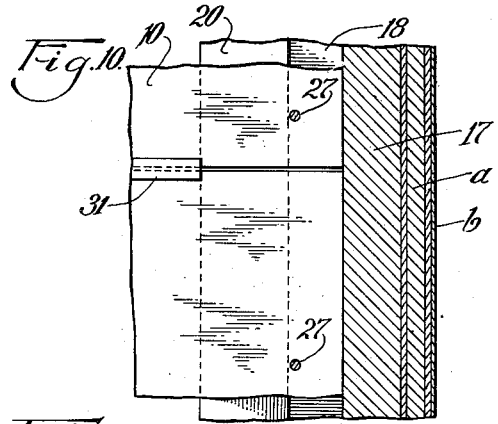
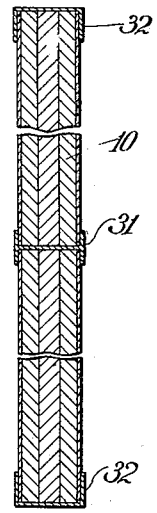
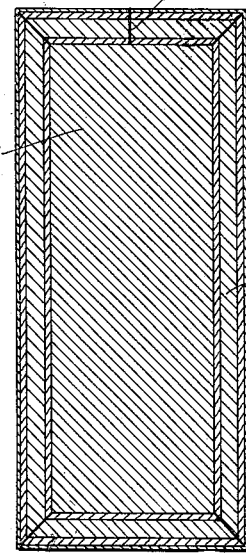
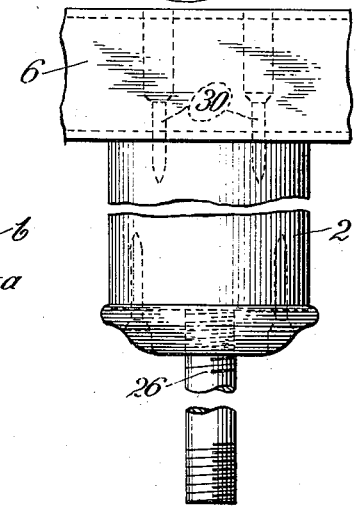
Inventor
George R Meyercord
By Wm F Freudenreich
Atty.

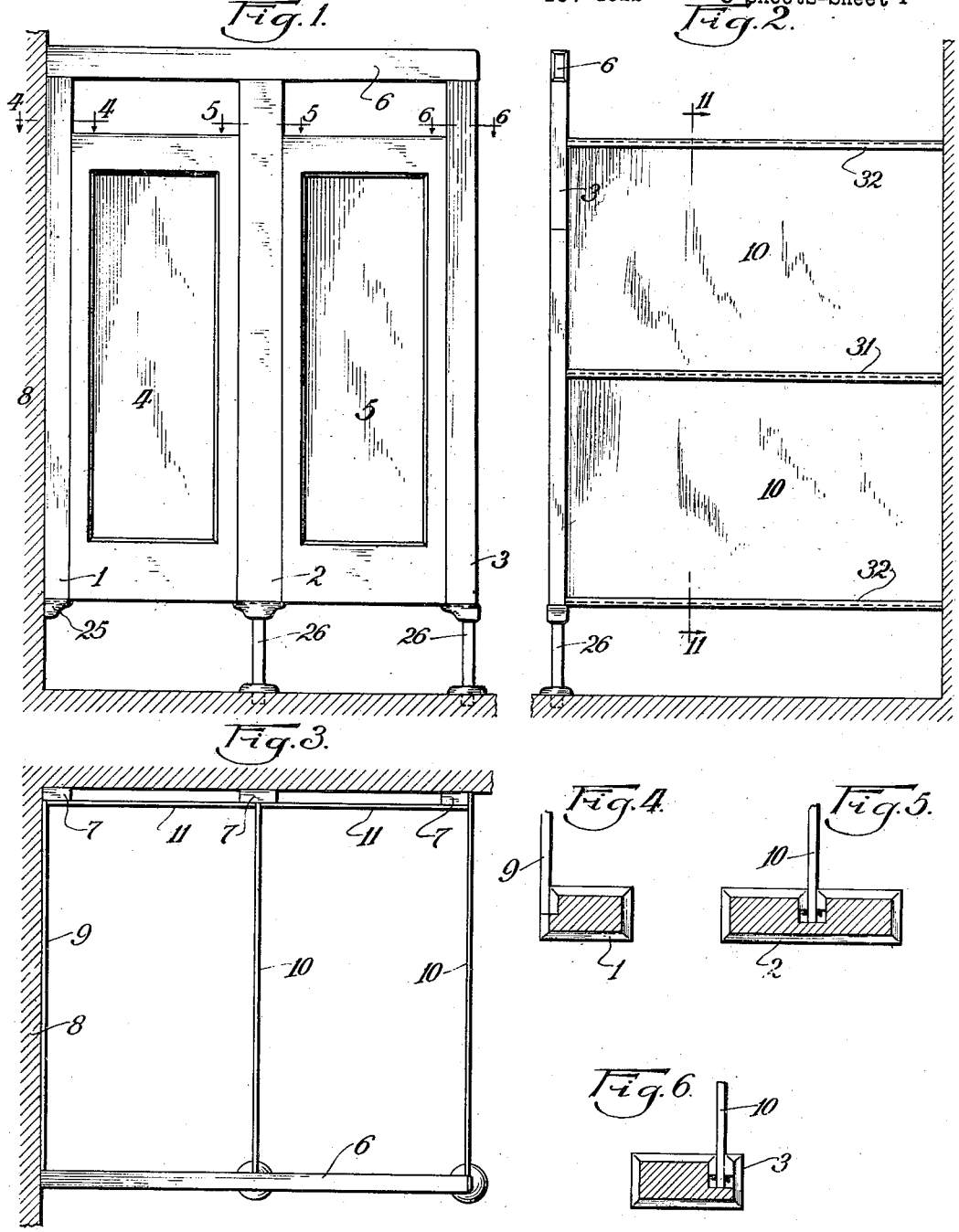

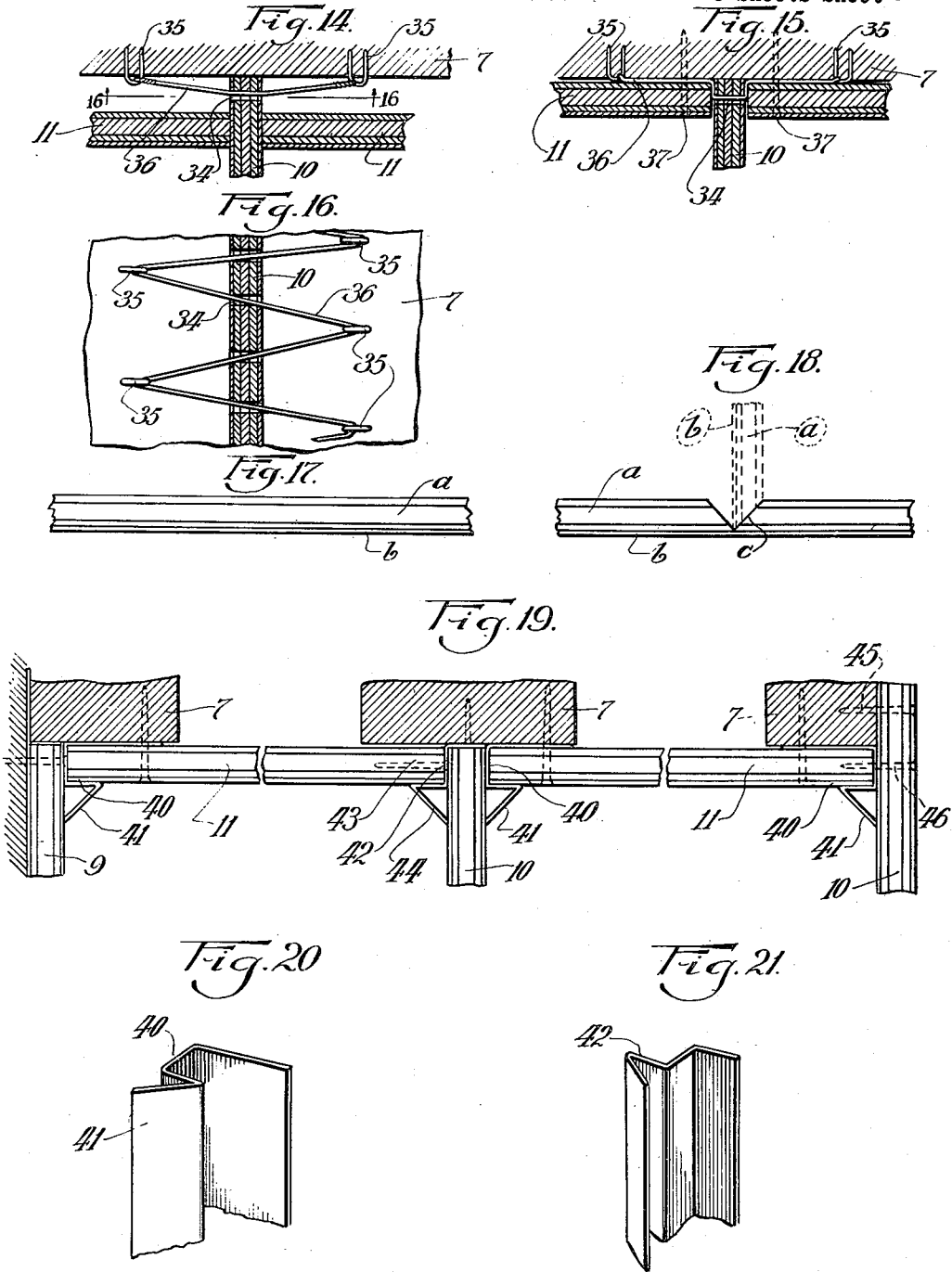

Patented Jan. 1, 1924.

1,479,474

UNITED STATES PATENT OFFICE.

GEORGE R. MEYERCORD, OF CHICAGO, ILLINOIS, ASSIGNOR TO HASKELITE MANUFACTURING CORPORATION, A CORPORATION OF NEW YORK.

BOOTH OR COMPARTMENT.

Application filed February 16, 1922. Serial No. 536,955.

*To all whom it may concern:*

Be it known that I, GEORGE R. MEYERCORD, a citizen of the United States, residing at Chicago, county of Cook, State of Illinois, have invented a certain new and useful Improvement in Booths or Compartments, and declare the following to be a full, clear, and exact description of the same, such as will enable others skilled in the art to which it pertains to make and use the same, reference being had to the accompanying drawings, which form a part of this specification.

My invention has for its object to produce a simple and novel structure constituting a booth or the like, which will be neat in appearance and sanitary, which will be strong and durable, and which can quickly and easily be assembled from prepared parts.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a front elevation of a two compartment booth arranged in accordance with my invention;

Fig. 2 is a side view, and Fig. 3 a plan view of the booth shown in Fig. 1;

Figs. 4, 5 and 6 are sections taken respectively on lines 4—4, 5—5 and 6—6 of Fig. 1;

Fig. 7 is a view similar to Fig. 3, on an enlarged scale, more clearly to bring out the details of construction;

Fig. 8 is a view similar to Fig. 5, on an enlarged scale;

Fig. 9 is a view similar to Fig. 6, on an enlarged scale;

Fig. 10 is a section taken approximately on line 10—10 of Fig. 8;

Fig. 11 is a section on an enlarged scale, taken approximately on line 11—11 of Fig. 2;

Fig. 12 is a cross section on the same scale as Figs. 7, 8 and 9 through the rail extending across the top of the posts;

Fig. 13 is a front elevation, on an enlarged scale, of the middle post and the top rail, parts being broken away;

Fig. 14 is a horizontal section on an enlarged scale through the rear portion of the dividing partition between two compartments and the adjacent rear panels, illustrating a step in the assembling of the structure;

Fig. 15 is a view similar to Fig. 14 showing the condition of the parts when the work of assembling them has been completed;

Fig. 16 is a section on line 16—16 of Fig. 14;

Fig. 17 is an edge view of a fragment of one of the plymetal sheets which is used to face the post and rail;

Fig. 18 is a view similar to Fig. 17 illustrating two stages in the process of applying the plymetal sheet to one of the posts;

Fig. 19 is a plan view of the rear portion of a two compartment booth such as shown in Figs. 1 to 3 illustrating a different method of attachment of the panels than that shown in Figs. 14, 15 and 16;

Fig. 20 is a perspective view of a fragment of one of the combined holding strips and coves employed in the construction illustrated in Fig. 19; and Fig. 21 is a view similar to Fig. 20 showing another combined holding strip and cove.

In carrying out my invention I make use of posts and panels which, when assembled, present sanitary metal surfaces, the metal being backed by strong wood cores so that there is no danger of warping or buckling.

In the drawings I have illustrated my invention as applied to a two compartment booth placed in the corner of a room, since here are found most of the problems that present themselves in the construction of booths or stalls.

In the arrangement shown, there are three posts, 1, 2 and 3, at the front of the structure. Between the posts 1 and 2 there may be a door 4 and between the posts 2 and 3 there may be a door 5. Across the top of the posts extends a rail 6. On the wall behind the posts are furring strips 7. Between the post 1, which is attached to the side wall 8 of the room or building, and the rear wall is a panel or series of panels 9 faced on the exposed side with metal. Similarly, between the posts 2 and 3 and the rear wall of the room or building are panels or series of panels 10 faced with metal on both sides. The rear wall is covered with panels or series of panels 11 lying against the furring strips.

The construction of the posts is best shown in Figs. 4 to 9. Each post consists of a core member around which is wrapped or folded a laminated sheet faced on the outer side with comparatively thin sheet metal, which material I shall designate by the general term plymetal; a groove being left for the reception of the adjacent end of the corresponding panel or series of panels. The plymetal itself is shown in Figs. 17 and 18 and may conveniently consist of a three-ply sheet of wood $a$ faced on one side with a thin sheet of metal $b$. In order to bend or fold a sheet of this kind, parallel excisions are made in the same, the excisions extending entirely through the wooden body portion $a$ but not into the metal facing. The posts which I have illustrated are all rectangular and the grooves are rectangular in cross section, so that all of the bends in the plymetal will be right-angle bends. Right-angle bends can conveniently be secured in such a way as to produce sharp clean corners, by making the excisions in the shape of a V whose angle is ninety degrees as indicated at $c$ in Fig. 18. Therefore, if excisions of this kind are properly located in a sheet, the latter can conveniently be bent into the desired shape about the core member and then be fastened to the latter in any convenient way, preferably by gluing.

The details of the post 1 are best shown in Figs. 4 and 7, this post comprising a rectangular core 12 having half of one side cut away so as to offset it inwardly, as indicated at 13, a distance equal to the thickness of the plymetal. The sheet of plymetal is folded around the post in such a way that one marginal portion 14 lies against the face 13 while the other marginal portion 15 lies against the remaining half of that side of the core member on which the face 13 is located. This leaves a groove or notch at one corner of the post into which the end of a side panel 9 for the left hand booth or compartment may extend.

The middle post comprises a core member 17 having in one side thereof a groove 18 whose width is more than twice that of the plymetal. The plymetal is folded around the core member and has its two end marginal portions 19 and 20 extending into the groove; the member 19 lying against one of the side walls of the groove and the member 20 against the other side wall. The members 19 and 20 are not as wide as the depth of the groove so that after the plymetal has been applied to the core, the effective cross sectional area of the groove is T-shaped.

The right hand post 3 comprises a core 21 provided with a groove 22 similar to the groove 18 but placed at one side so that the outer wall of the groove is formed by the plymetal sheathing. The extreme end or marginal portions of the plymetal are extended into the groove, as indicated at 23 and 24, so as to reduce the effective cross sectional area of the groove to a T shape.

In setting up the booth, a suitable wall bracket 25 is attached to the bottom of the post 1 and the panel 9 is then nailed to this post. The panel 9 is then nailed to the wall 8, preferably along a line close to the post 1 and along the extreme rear edge. The wall bracket 25 is then fastened to the wall 8. The rear left hand wall panel 11 is then secured in place in the manner to be hereinafter described; the middle post 2 is then fastened to the floor in an upright position, preferably upon a foot or pedestal 26 which is adjustable in the vertical direction; and the intermediate partition 10 is then attached at its front end to the post and at its rear end to the rear wall; or, if desired, the intermediate partition may be placed in position before the left hand rear panel is attached. The manner of fastening the intermediate partition to the middle post is best shown in Figs. 8 and 10. Near the front edge of the partition nails 27 are driven in a row parallel with the edge at right angles to the plane of the partition so as to project on opposite sides thereof; the nails being shorter than the width of the wide portion of the groove 18. The row of nails is so located that when the front end of the partition bottoms in the groove, the nails will bear against the inner ends of the large marginal portions 19 and 20 of the plymetal. The partiton may therefore be connected to the post by entering it into the groove from the top of the post and dropping it down until it rests upon the top of the foot or pedestal. The side panel at the right hand side of the booth is just like the intermediate partition, being provided with a row of nails or pins 27 which enter the wide portion of the slot 22 in the post 3 and engage with the inner ends of the marginal portions 23 and 24 of the plymetal. The rear end of the side panel 10 and the corresponding rear panel 11 are then attached to the rear wall of the room or building and, when the top rail 6 is fastened upon the posts, the booth is completed.

The top rail may take any suitable form but is preferably made as shown in Fig. 12 in which a rectangular core 28 is covered with plymetal similar to that employed in the posts, the plymetal being folded around the core and the ends conveniently meeting in a butt joint 29. The top rail may be fastened to the posts in any convenient way as, for example, by screws 30 as shown in Fig. 13.

Each of the members 9, 10 and 11 may be made of a single piece or of a plurality of narrow panels laid one upon the other, edge to edge. Thus, in the arrangement shown, each wall or partition is made of two panels. Between the two panels of each set is located a metal strip 31, H-shaped in cross section, as best shown in Fig. 11, this strip locking the two panels against relative lateral displacement and concealing the joint between them. The top and bottom edges of each wall or partition may be finished with a channel-shaped strip 32 fitting over the same.

In Figs. 14–16 I have illustrated a simple means for fastening the intermediate partition to the rear wall or support. At intervals along the partition, close to the rear edge, I place holes 34. Vertical rows of staples are driven into the furring strip 7 on opposite sides of the position the partition is to occupy, the rows being spaced apart a considerable distance. A light wire 36 is threaded through the staples and holes, passing in a zig-zag path from one side of the partition to the other from top to bottom. Initially the staples are driven in only partly, as illustrated in Fig. 14, but after the wires have been inserted, they are driven in until they lie substantially flush with the front face of the furring strip as shown in Fig. 15. Then after the left hand wall panel 9 in Fig. 3 has been placed in position, the left hand rear panel 11 is placed loosely in position, its left hand edge resting against the panel 9 and its right hand end resting on the wires beside the central partition. The central partition is then pressed toward the left until it rests firmly against the right hand edge of the left hand member 11, whereupon the latter is driven back against the furring strip, carrying the wires on that side with it as shown in Fig. 15, and is fastened firmly to the furring strip by nails or screws 37. It will be seen that the wires permit the central partition to be set up in approximately the position which it is to occupy, the final adjustment being quickly and easily made in conjunction with the placing in position of the rear panels. The right hand rear panel 11 is placed with its edge against the right hand side of the central partition and, when it is nailed or screwed in place, carries back the wires on the right hand side of the central partition; so that the joint between the three meeting panels assumes the appearance of the parts in Fig. 15, the central partition being rigidly held by the wires and the two back panels.

In Figs. 19 to 21 I have shown still another arrangement for attaching the panels to the rear wall; two differently-shaped sheet metal holding strips being used. Adjacent to the member 9 is placed a holding strip which is in the form of a channel 40 from the free edge of one flange of which extends a diagonal flange or wing 41 which terminates approximately in the plane of the web portion of the channel. This holding strip is laid in the corner formed between the panel 9 and the adjacent furring strip 7 on the rear wall, the web of the channel lying against the member 9, the straight flange resting against and being secured to the furring strip 7, while the inclined flange or wing 41 engages at its free edge with the member 9. The corresponding back panel 11 is inserted in the channel as shown in Fig. 19, the flange or wing 41 forming a cove in the corner between the panels 9 and 11. After the panel 11 has been placed in position, a holding strip in the form of a Z-bar 42 is set against the right hand end and against the furring strip at the center, one flange of the Z-bar lying flat against the furring strip and being fastened to it; the web of the Z-bar abutting against the edge of the panel 11 and being fastened to it by means of nails 43 or otherwise, and the third flange overlying the outer face of the panel 11. This latter flange has a diagonal wing portion 44 extending from the free edge back to the plane of the web portion of the Z-bar. After the holding member 42 has been placed in position, the intermediate panel 10 is set in place, resting at its rear edge against that flange of the holding member which is secured to the furring strip and at the left hand side against the web of the Z-bar and against the free edge of the wing 44 which serves as a cove in the corner between the members 11 and 10. One of the holding strips 40 may then be laid in the corner between the furring strip 7 and the central partition 10, bearing the same relation thereto as does the holding member to the furring strip 7 and the side wall panel 9. The right hand rear panel 11 is then inserted in the channel of the holding strip. At the right hand end of the right hand panel 11 may be placed another one of the holding strips 40, the channel therein fitting over the end of the panel. The side wall or panel 10 may be nailed to the furring strip as indicated at 45 and also into the end of the panel 11 through the web of the channel portion of the holding strip, as indicated at 46. With this arrangement there is obtained a cove in each of the rear vertical corners and a secure fastening of the panels to the rear wall is effected without leaving any nails exposed in the interior of the booth.

I claim:

1. A post having a groove therein, and a laminated sheet having an outer layer of metal bent around and forming a facing for the post and having a marginal portion projecting into said groove.

2. A post having a groove extending lengthwise thereof, and a laminated sheet having an outer layer of metal of less thickness than the width of the groove bent around said post and having a marginal portion projecting into said groove at one side of the latter.

3. A post having a groove extending lengthwise thereof, and a facing sheet of less thickness than half the width of the groove bent around and in contact with the post and having two opposite marginal portions projecting into said groove at opposite sides of the latter, said marginal portions being of less width than the depth of the groove, and said sheet comprising a plurality of layers the outer of which is metal.

4. A post having a groove extending longitudinally thereof, and a sheet of less thickness than half the width of said groove bent around the post and having opposed marginal portions bent into said groove and lying at opposite sides thereof, said sheet comprising a plurality of layers one of which at least is of wood and the outer of which is metal.

5. A post having a groove extending longitudinally thereof, and a sheet of less thickness than half the width of said groove bent around the post and having opposed marginal portions bent into said groove and lying at opposite sides thereof, said marginal portions being of a width less than the depth of the groove, said sheet comprising a plurality of layers one of which at least is of wood and the outer of which is metal.

6. A post having a groove extending longitudinally therein, a sheet of plymetal of less thickness than the width of the groove bent around the post and having a marginal portion projecting into said groove, said sheet having parallel excisions extending lengthwise thereof and passing through the body of the sheet from the inner side to the metal layer, the excisions being of such shape and so spaced that the sheet is adapted to be laid about the post as aforesaid by bending it along the lines of the excisions.

7. In a structure of the character described, a wall, a panel placed against said wall at right angles thereto, wires passing freely through said panel near the wall and connected to the wall at opposite sides of and at a considerable distance from said panel, and other panels lying flat against said wall and abutting against the first panel so as to force the wires against said wall and draw the first panel tightly against it.

8. In a structure of the character described, a supporting member; a plate having a flange lying against said member, a web projecting at right angles to said member and a second flange arranged parallel with said member; and a panel lying against said member and underlying said second flange and abutting against said web; said panel having a thickness equal to the width of said web.

9. In a structure of the character described, a supporting member; a plate having a flange lying against said member, a web projecting at right angles to said member, a second flange arranged parallel with said member, and a third flange extending outwardly and diagonally from the edge of said second flange to approximately the plane of said web; and a panel lying against said member and underlying said second flange and abutting against said web; said panel having a thickness equal to the width of said web.

10. In a structure of the character described, two parallel upright posts having undercut grooves extending lengthwise thereof in the side facing the wall of a room in which the structure is placed, panels extending from said wall to said posts, each panel having an end located in the slot in one of the posts, projections on the latter end of each of said panels in the wider portion of the corresponding slot to prevent withdrawal of the panel in a direction transverse of the post, a panel extending along said wall between the other two panels, and means for securing all of said panels to said wall.

In testimony whereof, I sign this specification.

GEORGE R. MEYERCORD.